US008554168B1

(12) United States Patent
Bonner et al.

(10) Patent No.: US 8,554,168 B1
(45) Date of Patent: Oct. 8, 2013

(54) SYSTEMS AND METHODS FOR ALTERNATIVE ROUTING OF VOICE OVER IP ORIGINATED EMERGENCY CALLS

(75) Inventors: Thomas W. Bonner, Smyrna, GA (US); Judson J. Flynn, Decatur, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1016 days.

(21) Appl. No.: 11/676,037

(22) Filed: Feb. 16, 2007

(51) Int. Cl.
H04M 11/04 (2006.01)
H04W 24/00 (2009.01)

(52) U.S. Cl.
USPC .................. 455/404.1; 455/404.2; 455/456.1; 455/457

(58) Field of Classification Search
USPC ................ 455/404.1, 404.2, 415, 456.3, 461, 455/414.1, 414.2, 440, 456.1, 457, 455/418–422.1, 432.1, 432.3–449, 550.1, 455/552.1, 553.1, 556.1, 56.2; 370/310, 370/395.52, 493–495, 310.2, 328, 338, 370/352–356; 379/37–51, 88.02, 88.18, 379/93.29, 93.31; 340/287–309; 715/700–866
See application file for complete search history.

(56) References Cited

U.S. PATENT DOCUMENTS

| | | | |
|---|---|---|---|
| 7,564,838 B2* | 7/2009 | McGary | 370/352 |
| 2005/0063519 A1* | 3/2005 | James | 379/45 |
| 2005/0090225 A1* | 4/2005 | Muehleisen et al. | 455/404.1 |
| 2005/0186948 A1* | 8/2005 | Gallagher et al. | 455/414.1 |
| 2006/0004905 A1* | 1/2006 | Martino | 709/200 |
| 2006/0063539 A1* | 3/2006 | Beyer | 455/456.3 |
| 2006/0293024 A1* | 12/2006 | Benco et al. | 455/404.2 |
| 2007/0049287 A1* | 3/2007 | Dunn | 455/456.1 |
| 2008/0125077 A1* | 5/2008 | Velazquez et al. | 455/404.2 |
| 2008/0133124 A1* | 6/2008 | Sarkeshik | 701/201 |
| 2008/0160952 A1* | 7/2008 | Bull et al. | 455/404.2 |

OTHER PUBLICATIONS

National Emergency Number Associate; Interim VoIP Architecture for Enhanced 9-1-1 Services (i2); NENA; Dec. 6, 2005.
Martin et al.; "First Report and Order and Notice of Proposed Rulemaking"; FCC 05-116; Jun. 3, 2005.

* cited by examiner

Primary Examiner — San Htun
(74) Attorney, Agent, or Firm — Parks IP Law LLC; Jennifer P. Medlin, Esq.

(57) ABSTRACT

Systems and methods are described for routing Voice over Internet Protocol (VoIP) originated emergency calls. Where registered location information is not available, the present invention can attempt to identify an appropriate emergency call receiving office based on available information regarding the caller's physical location. Such information can include the IP address of the caller and, where the VoIP device is a dual mode device, the location of the last cellular base station accessed by the device. Where registered location information does exist, the present invention offers methods for ensuring that the registered location information is not obsolete and in need of updating and, in some cases, providing a manual override of call routing to the caller.

12 Claims, 11 Drawing Sheets

SYSTEMS AND METHODS FOR ALTERNATIVE ROUTING OF VOICE OVER IP ORIGINATED EMERGENCY CALLS

TECHNICAL FIELD

This invention relates generally to the routing of emergency 911 telephone calls. More specifically, the invention relates to the routing of Voice over Internet Protocol (VoIP) 911 calls to an appropriate emergency call center based on a measured or estimated location of the caller.

BACKGROUND OF THE INVENTION

Since a national introduction in 1965, Americans have come to increasingly depend on universal access to emergency services via the digits 9-1-1. The digits 911 have become synonymous with emergency telephone calls, and it has been estimated that 200 million 911 calls are made each year in the United States. Universal use of these three digits for access to emergency services gives callers ready access to state and local emergency responders regardless of the jurisdiction from which the call is being made. The system has become an effective and reliable conduit for directing life saving efforts of first responders to where they are needed.

911 service generally falls into one of two categories, basic 911 and enhanced 911 (E911). Basic 911 service forwards a 911 call from a telephone service provider's switch to a geographically appropriate emergency call center. The call is merely forwarded to this center and no further information about the call is provided to the call center. The caller's identity and location are disclosed to an answering operator through discussions with the caller.

E911 service instead routes 911 calls using a selective router. The selective router can route a call based on the calling number. The selective router can query a selective router database (SRDB) using the calling number (referred to in 911 terminology as automatic numbering information or ANI) to determine the appropriate public service answering point (PSAP) for handling the call. The call and the ANI are then forwarded to the PSAP which, in turn, queries a location database using the ANI. The location data (referred to as automatic location information or ALI) associated with the ANI is then provided to the PSAP. The ALI returned is a physical address; the integrity of which has been verified by comparison with a separate database known as a Master Street Address Guide (MSAG). E911 calls are routed over a dedicated network which is interconnected with, but separate from, the public switched telephone network (PSTN). The selective router, trunk lines connecting the selective router and the PSAP, the ALI database, the SRDB, trunk lines between the ALI database and the PSAP, and the MSAG together comprise the dedicated wireline E911 network.

While first introduced on the wireline networks of the day, access to emergency services via dialing 911 on modern mobile devices has posed challenges to the operation of the 911 emergency services network. Wireline access is commonly provided by a local exchange carrier, which provides service to a fixed business or residential location. A telephone number of an account can therefore be easily and reliably associated with a corresponding location address in system databases, so that 911 calls received from the number can be routed to an emergency call center best situated to deal with any emergency that exists at that address.

The location of mobile and nomadic devices, however, is not so reliably determined. These devices retain their telephone numbers as they are moved from place to place. Obtaining the required location information for the routing of such calls requires a wholly different, or at least modified, solution. Due to the public's reliance on and expectation of the availability of emergency help via dialing 911 on a telephony device, the Federal Communications Commission (FCC) has taken steps to ensure reliable 911 service continues to be available via these newer technologies.

Mobile telephony devices such as handheld cellular telephones communicate through a network of geographically distributed base stations. At any given time, an active cellular telephone is communicating primarily through one base station. Knowledge of the location of the base station with which the handset is communicating can provide a rough estimate of the location of the handset. The coverage area of a base station, however, can span many square miles. Although a handset communicates primarily with one base station, transmissions from other nearby base stations can be detected by the handset. Transmissions from the handset can be picked up at other base stations as well. By measuring the difference between the times of arrival of handset transmitted signals at several base stations (with known locations), the position of the handset can be determined with far more precision. In addition, handsets which include global positioning sensors can provide location information obtained using positioning satellites orbiting the earth.

The FCC has directed mobile communication providers to make such measurements of device location and provide accurate device location to call routing services for 911 calls. This helps to ensure that emergency calls placed via these mobile terminals are routed to the appropriate call center regardless of the location of the device. Receiving PSAPs are given ANI and ALI for these calls.

More recently, the emergence of Voice over Internet Protocol (VoIP) services has presented yet another challenge to the proper routing of 911 calls. VoIP telephony services transmit and receive voice data in packets having a format appropriate for transmission over the Internet. Instead of a traditional PSTN line, voice signals are sent over a broadband Internet connection and routed over the Internet. Through interconnections with the PSTN, VoIP calls can be sent to and received from the PSTN.

While a VoIP account generally has a static telephone number, the IP address of the broadband Internet connection over which the account is used can be dynamic. Furthermore, even if a static IP is utilized, there is no database which reliably maps IP addresses to physical addresses (although as discussed below an estimate of the location of the physical location where the IP address is being used can be made). In addition, the VoIP equipment can be moved from one location to another so the equipment and the account can be used over more than just a single broadband Internet connection.

Upon first offering telephony services, VoIP providers did not have facilities in place for providing location specific information to the 911 emergency network. VoIP users expecting normal 911 access were, in some cases, routed to emergency call centers several hundreds of miles (or more) away from the caller's physical location. Incidents such as these prompted the FCC to issue a number of requirements applicable to the provision of VoIP services and the availability of reliable 911 access via these services. These requirements can be found in "First Report and Order and Notice of Proposed Rule Making FCC 05-0116" the entirety of which is herein incorporated by reference.

The FCC order requires all interconnected VoIP providers (those who connect calls to the PSTN) to send 911 calls, a call back number (ANI), and a registered location for each call to the public service answering point (PSAP), to a designated statewide default answering point, or to an appropriate local emergency authority that serves the caller's registered location. These calls are required to be routed using ANI and to be routed over the dedicated wireline E911 network.

According to the FCC order, to obtain the necessary information to fulfill the registered location requirement, VoIP providers must obtain service location information from their customers, prior to the installation of service. If the service can be moved from one location to another, the VoIP providers must offer a method for the customers to update the location information. At least one method of updating this information must include the use of the customer premises equipment (CPE) of the VoIP installation. Providers cannot allow customers to opt out of E911 service. The National Emergency Number Association (NENA) has published a proposed architecture for service providers to adopt for implementing the FCC order. This document is entitled "Interim VoIP Architecture for Enhanced 9-1-1 Services (i2)" and can be found at http://www.nena.org/media/files/NENA_08-001_V1_12-06-05.pdf This document is incorporated by reference herein in its entirety.

Delays in processing location information can occur after new VoIP installations. For example, where VoIP equipment is purchased at a point of sale location, the purchaser (VoIP customer) can provide an address for the location where the VoIP will be used. The location can be validated at the point of sale to determine if it is an actual address. This validation, however, does not fully validate the address as MSAG compliant such that it can be used in the E911 system. An MSAG validation can take up to 48 hours and can fail. In that case the location information supplied by the customer cannot be used by the E911 system to enable the selective router to send the call to the appropriate PSAP. It is also possible that the address information could be corrupted (through a failed update for example) or obsolete due to the VoIP equipment being moved to a location which differs from the location on record with the VoIP provider.

Systems and methods are therefore needed for providing a default treatment in cases where location information supplied by the customer is unavailable or obsolete. Such systems and methods can route calls to emergency call centers which are capable of dispatching responders to the source location of the call (as closely as that can be determined from the available information) or to a center capable of quickly communicating with or capable of forwarding the call to the center.

SUMMARY OF THE INVENTION

The various embodiments of the present invention overcome the shortcomings of the prior art by providing, in one embodiment, a method of routing a Voice over Internet Protocol (VoIP) originated 911 call by performing an IP geolocation measurement based on an originating IP address of the 911 call and routing the 911 call to a call center based on the results of the IP geolocation measurement. The call can be routed to a call center associated with city data if the measurement returns city data. The call can be routed to a call center associated with state data if the measurement returns state data. The call can also be routed to a call center associated with country data if the measurement returns country data. The 911 call can be routed to a default call center if the IP geolocation measurement fails or if the IP geolocation measurement does not return city data, state data, or country data.

Some embodiments, where the VoIP device is a dual mode device, can further include determining the location of the base station with which the dual mode device most recently communicated and comparing the location of the base station to the IP geolocation results to verify the results of the IP geolocation measurement.

In some embodiments, the method can be initiated by a caller override of 911 call routing which would otherwise be based on registered location information associated with the VoIP account.

In another embodiment the invention provides a method of routing a VoIP originated 911 call from a dual mode device which includes determining the location of the base station with which the dual mode device most recently communicated and routing the 911 call to a call center based on the location of the base station. This method can be initiated by a caller override of 911 call routing which would otherwise be based on registered location information associated with the VoIP account.

The invention also provides a method of routing a VoIP 911 call by storing a medium access control (MAC) address in a VoIP service provider server; associating the stored MAC address as an authorized MAC address for the VoIP account; receiving a MAC address in a header of an IP packet associated with the 911 call; comparing the received MAC address to the authorized MAC address; checking the VoIP account records to determine if the account has a registered location; and routing the 911 call as an E911 call using the registered location information if the account has a registered location and the received MAC address matches the authorized MAC address. If the received MAC address does not match the authorized MAC address, the method can include the steps of performing an IP geolocation measurement based on an originating IP address of the 911 call, and routing the 911 call to a call center based on the results of the IP geolocation measurement. In some embodiments where the VoIP device is a dual mode device and the received MAC address does not match the authorized MAC address, the method can include the steps of determining the location of the base station with which the dual mode device most recently communicated, and routing the 911 call to a call center based on the location of the base station.

In addition, the invention provides a method of routing a VoIP originated 911 call by providing a location indication on a display of the VoIP device used to place the 911 call, the location indication being associated with the VoIP account used to place the 911 call, providing a notification on the display that the 911 call will be routed based on the location indicated, and providing a selectable caller override option for overriding the routing of the 911 call based on the location indicated. The method can also include the steps of receiving a caller override signal and, in response to the caller override signal, performing an IP geolocation measurement based on an originating IP address of the 911 call, and routing the 911 call to a call center based on the results of the IP geolocation measurement. Where the VoIP device is a dual mode device, the method can also include receiving a caller override signal and, in response to the caller override signal, determining the location of the base station with which the dual mode device most recently communicated, and routing the 911 call to a call center based on the location of the base station.

In addition, a selectable list of routing options can be provided on the display. A routing selection can be received and the 911 call can be routed based on the selection. The selectable list can include a list of addresses previously associated with the VoIP account, an option for routing based on an IP geolocation measurement, and/or an option for routing based on the location of a base station most recently accessed by the VoIP device.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION

Figure 1:
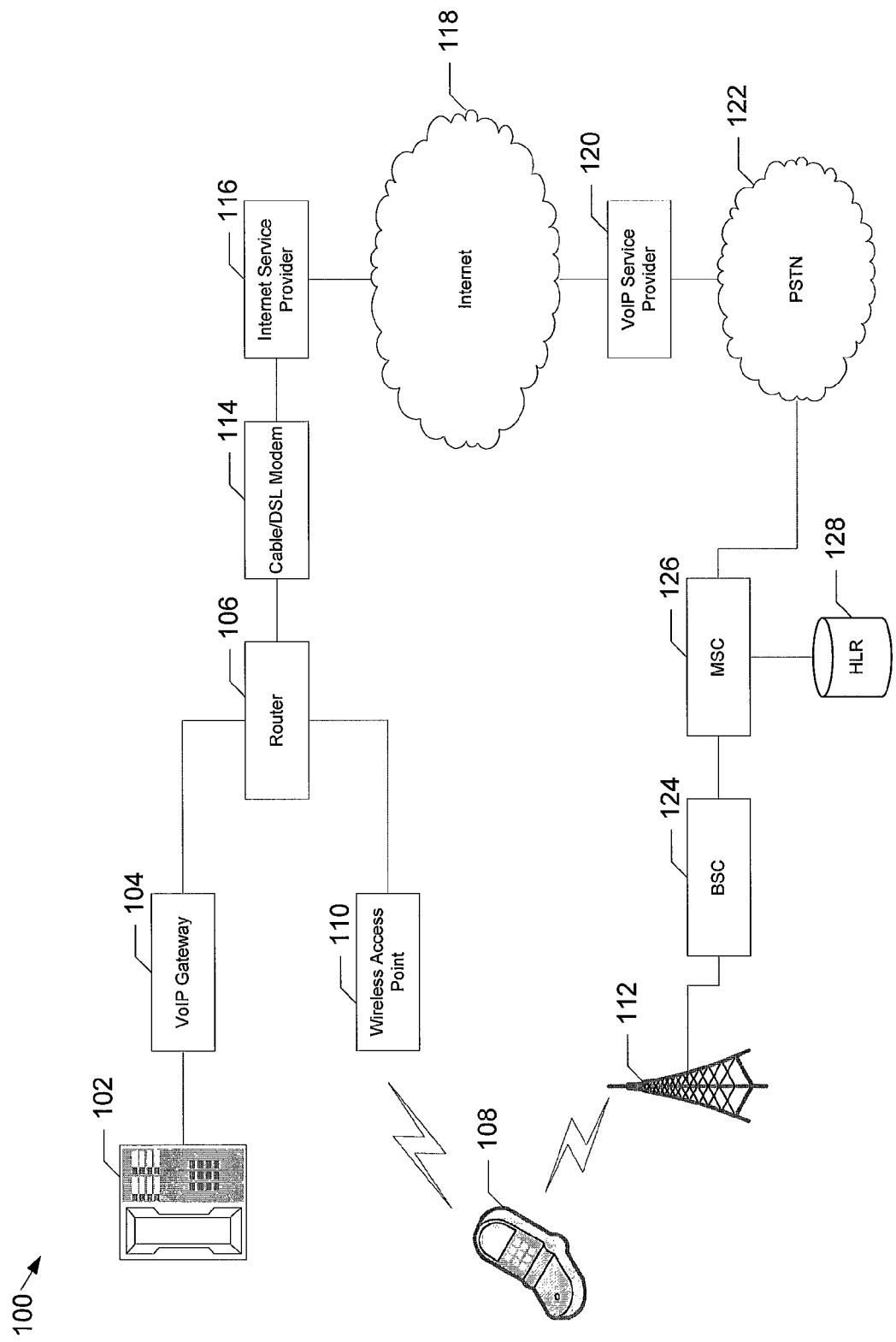
FIG. 1 illustrates a block diagram of an exemplary Voice over Internet Protocol (VoIP) environment in which the present invention can be employed.

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

In one embodiment, the present invention finds application using a dual-mode wireless equipment. As used herein, the term dual-mode wireless equipment (or device, handset, etc.) is a communication device which can communicate wirelessly via a cellular network, and can also communicate using VoIP. Any wireless standard can be employed for the cellular communication mode including, but not limited to, GSM, IS-95/CDMA, W-CDMA, UMTS, etc. Communications made in the VoIP mode can be conducted over a comparatively short range radio link (e.g., WiFi/IEEE 802.11x or BLUETOOTH®) with a wireless access point which provides access to a broadband Internet connection.

Dual-mode wireless equipment can provide a wireless (cellular) customer with, for example, the convenience of communicating using their wireless handset via VoIP while at home so wireless plan air time is not spent on such calls. With such a system in place, many customers may elect to discontinue traditional PSTN wireless service at their home. A dual-mode system can also make a separate VoIP service redundant and unneeded. While the invention is described with reference to a dual mode wireless equipment embodiment, the invention should not be considered to be limited to dual mode cellular/VoIP installations. It will be apparent to one of skill in the art that many aspects of the present invention are applicable not only dual mode embodiments, but also to standalone VoIP installations which do not incorporate dual mode functionality.

Referring now to the drawings in which like numerals indicate like elements throughout the several views, the drawings illustrate certain of the various aspects of exemplary embodiments of the invention.

FIG. 1 shows an exemplary environment 100 in which the methods of the present invention can be employed. The figure is marked as prior art due to the existence of such systems in the art. Components of this system can be modified, however, to incorporate the present invention. When such modifications are made, the modified system should not be considered as prior art.

A telephone 102 is connected to a Voice over Internet Protocol (VoIP) gateway 104. The VoIP gateway 104 is in turn connected to a router 106. A dual-mode handset 108 can communicate with a wireless access point 110 and also with a base station 112. Communication with the wireless access point 110 can occur via WiFi (according to the IEEE 802.11x standard) or via some other wireless protocol. Communication with the base station 112 can occur via any of the known cellular communication protocols. The wireless Access Point 110 is connected to the router 106. Alternatively, the router 106 can include an integrated wireless access point 110. The router 106 connects to a cable/DSL modem 114. The cable/DSL modem 114 connects to an Internet service provider 116 to access the Internet 118. It should be understood that the router 106 can instead connect to the Internet via a T1 line, a T3 line or the like. A VoIP service provider 120 is connected to the Internet 118 and to the Public Switchboard Telephone Network (PSTN) 122. Packetized voice information can be received by the VoIP service provider 120 from the dual-mode handset 108 and/or the telephone 102. This voice information can be converted into a format suitable for transmission over the PSTN 122 as is known in the art. The VoIP service provider 120 can receive voice calls intended for the dual-mode handset 108 and the telephone 102 from the PSTN 122, and convert the voice information therein into IP packets for delivery to the telephone 102 and/or the dual-mode handset 108.

The base station 112 is connected to a base station controller 124, which in turn connects to a mobile switching center 126. The mobile switching center 126 can access customer records stored in a home location register 128. The mobile switching center 126 also connects to the PSTN 122 so that wireless originated calls can be terminated at the PSTN 122 and PSTN 122 originated calls can be terminated at the wireless (cellular) network. Although the elements shown are typical elements of a GSM wireless network, these elements are shown for purposes of example. The methods of the current invention are equally applicable to any cellular wireless technology.

The present invention provides systems and methods for routing VoIP originated 911 calls. While the FCC order requires that a VoIP installation have a registered location for the purposes of routing 911 calls, in some instances, as mentioned above, registered location data may not be available or may indicate an incorrect or obsolete location. In the case of an emergency call where no registered location data is available, it can still be advisable to attempt to connect the 911 call to an appropriate receiving facility. In such cases alternate sources of data can be employed to attempt to connect the caller to the most appropriate emergency call center that can be identified. Although the call might not be routed to the Public Service Answering Point (PSAP) designated for the caller's actual physical location, the call can be routed to an emergency call center which can dispatch first responders to the location or can transfer the call to a center with that ability.

Figure 2:
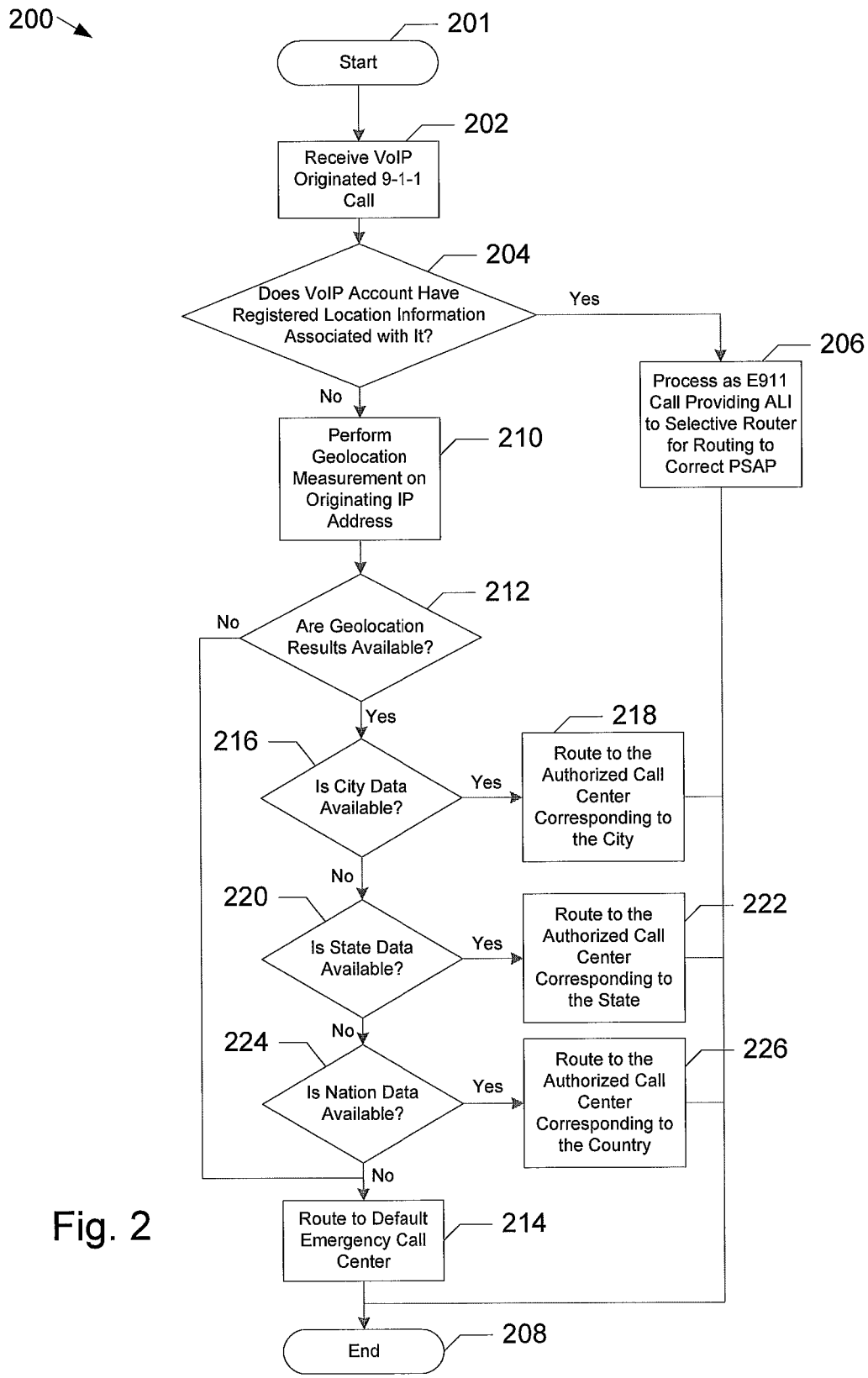
FIG. 2 illustrates a flow diagram of a method for routing a VoIP 911 call based on IP geolocation where there is no registered location information associated with the VoIP account placing the emergency call, according to the present invention.

FIG. 2 shows a method 200 for routing a VoIP 911 call based on IP geolocation where there is no registered location information associated with the VoIP account placing the emergency call. The method 200 starts at block 201. At block 202, a VoIP originated call is received. This call can be received at the VoIP service provider 120. The VoIP service provider 120 can query its account databases to determine if the account is associated with a registered location. At block 204, it is determined if the account is associated with a registered location. If the account is associated with a registered location, processing continues to block 206 where the 911 call is processed as an E911 call in compliance with the FCC order using the registered location information. The method 200 then ends at block 208. From block 204, if the account is not associated with a registered location, processing continues to block 210. At block 210 an IP geolocation measurement based on the originating IP address is performed.

As used herein, the term IP geolocation refers to the location of an IP address which can be estimated or measured based on known locations of Internet routers in the routing path of the IP address.

At block 212, if IP geolocation results are not available (e.g., the measurement failed), processing continues to block 214 where the call is routed to a default emergency call center. From block to 212, if geolocation results are available, processing continues to block 216. At block 216, if city data is available from the geolocation results, processing continues to block 218 where the call is routed to the authorized call center corresponding to the city indicated. If no city geolocation data is available, processing continues to block 220 where a check is performed to determine if state geolocation data is available. If state data geolocation data is available, at block 222, the call is routed to the authorized call center corresponding to the state indicated. If no state geolocation data is available, processing continues to block 224 where a check is performed to determine if nation geolocation data is available. If nation data is available, at block 226 the call is routed to the authorized call center corresponding to the country indicated. If no nation IP geolocation data is available, processing continues to block 214 where the call is routed to a default emergency call center. While the method 200 shown in FIG. 2 might not result in the 911 call being delivered to the E911 PSAP corresponding to the location of the caller, the method 200 attempts to deliver the call to the nearest emergency call center that the resolution of the IP geolocation results can provide.

Figure 3:
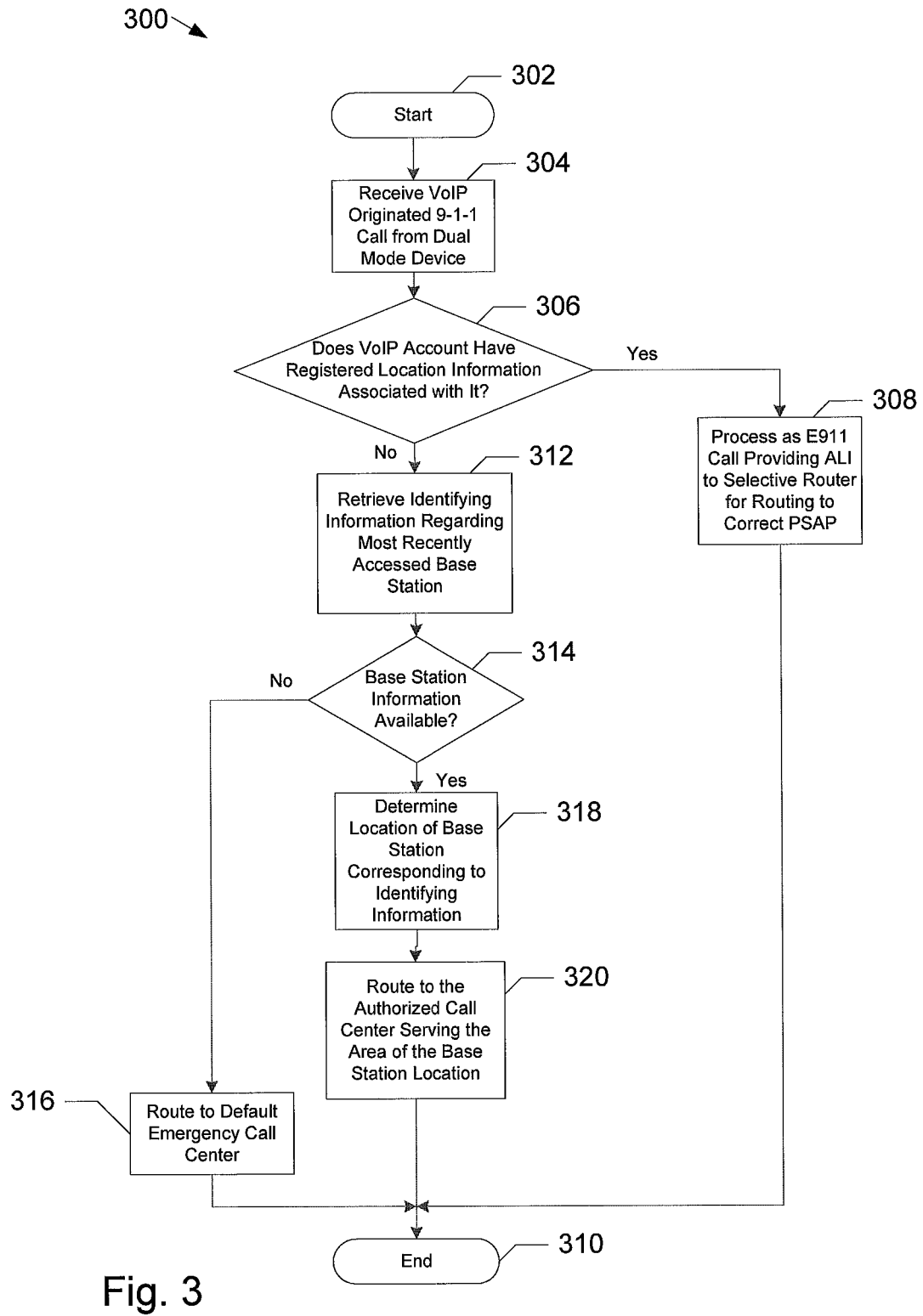
FIG. 3 illustrates a flow diagram of a method for alternate routing of a dual-mode device originated 911 call using the location of the base station with which the device most recently communicated, according to the present invention.

FIG. 3 shows a method 300 for alternate routing of a dual-mode device 108 originated 911 call using the location of the base station 112 with which the device 108 most recently communicated. The dual-mode device 108 can store an identifier in memory which uniquely identifies the base station 112 with which it most recently communicated. This identifier can be transmitted to the VoIP service provider 120 via the wireless link to the access point 110 and across the Internet 118. For this dual-mode example, the VoIP service is provided by the cellular service provider or by an affiliated VoIP partner. In either case, the VoIP service provider 120 has access to the cellular service provider's database linking base stations 112 with their unique identifiers and their locations. Alternatively, or in addition, the VoIP service provider 120 can receive a unique identifier for the device 108 and/or cellular account and retrieve the location of the base station 112 with which the device 108 last communicated based on this information. For example, the device 108 can transmit its International Mobile Subscriber Identity (IMSI) to the VoIP service provider 120, which can query the cellular provider's HLR 128 to determine the last base station 112 with which the device 108 communicated.

The method 300 starts at block 302 and proceeds to block 304 where a VoIP originated 911 call is received from a dual-mode device 108. At block 306, if the originating VoIP account is associated with a registered location, processing continues to block 308. At block 308, a call is routed as an E911 call using the registered location according to the FCC order. The method 300 ends at block 310. At block 306, if the account is not associated with a registered location, processing continues to block 312. At block 312, identifying information regarding the most recently accessed base station 112 is retrieved. As mentioned above this can comprise receiving a unique identifier for the base station 112 from the dual-mode 108 device or receiving an identifier for the device 108 or cellular account and retrieving the base station 112 information from the cellular network. At block 314, if no base station 112 information is available, processing continues to block 316 where the call is routed to a default emergency call center. The method ends at block 310. From block 314, if base station 112 information is available, processing continues to block 318. At block 318, the location of the base station 112 corresponding to the identifying information is determined. This determination can be made by querying the appropriate cellular network databases which include associations between base station 112 identifiers and the physical locations of those base stations 112. Processing then continues to block 320 where the emergency call is routed to the authorized call center serving the area corresponding to the base station's 112 determined location. Again, while the method 300 might not result in the 911 call being delivered to the E911 PSAP corresponding to the location of the caller, the method 300 attempts to deliver the call to the nearest emergency call center that can be determined based on the last base station 112 contact of the device 108.

Figure 4:
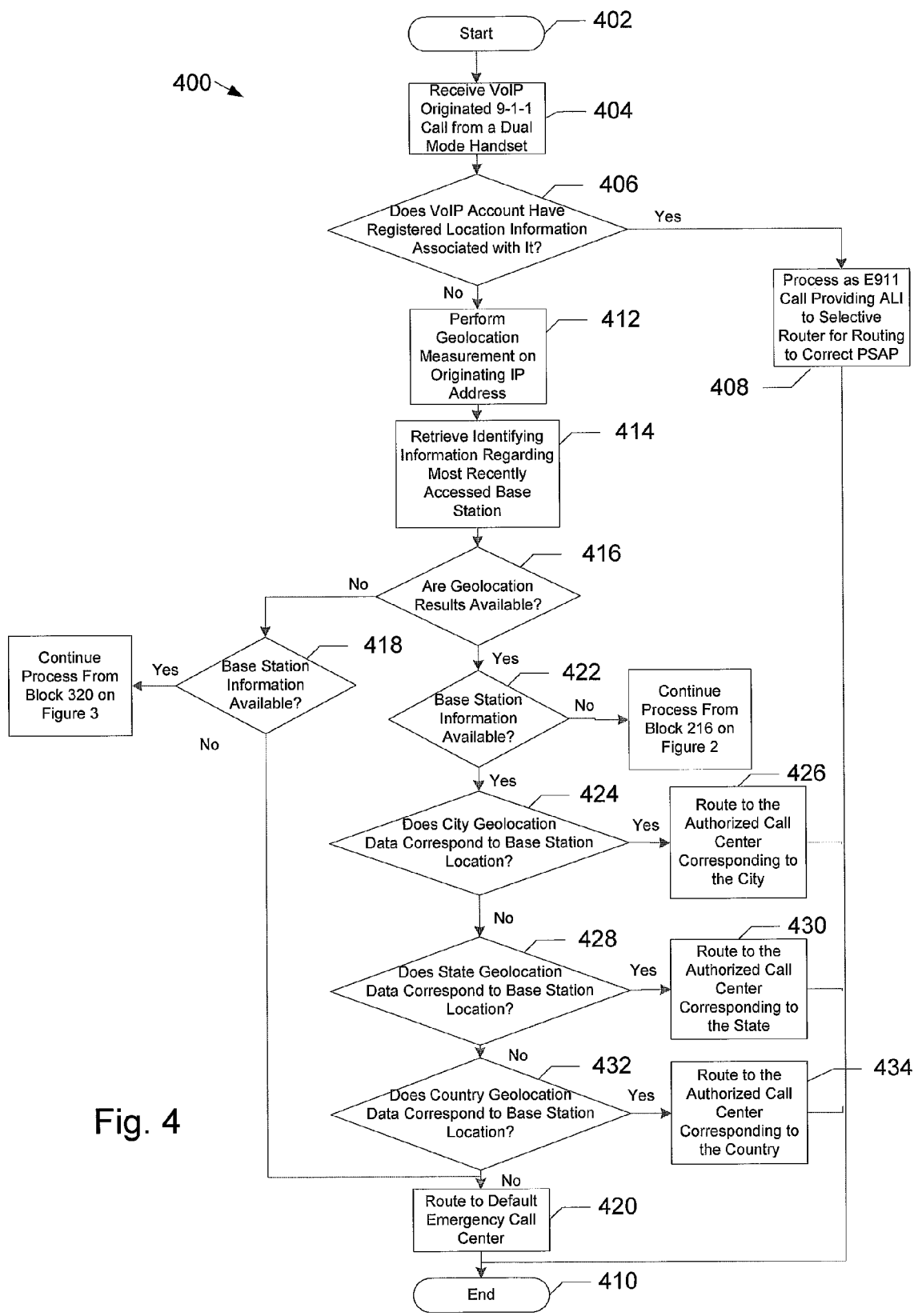
FIG. 4 illustrates a flow diagram of a method for routing a VoIP 911 call in accordance with aspects of the routing methods presented in FIG. 2 and FIG. 3 and performing a cross-checking function, according to the present invention.

FIG. 4 shows a method 400 which combines elements of the IP geolocation method 200 of FIG. 2 with the base station 112 location method 300 of FIG. 3, crosschecking the results of one method using another. The method 400 starts at block 402. At block 404, a VoIP originated 911 call from a dual-mode device 108 is received. Processing continues to block 406 where the account is checked to determine if the account is associated with a registered location. If so, processing continues to block 408 when the call is processed as an E911 call in accordance with the FCC requirements using the registered location information. The method ends at 410. From block 406, if there is no registered location information associated with the account, processing continues to block 412 where an IP geolocation measurement is performed based on the originating IP address for the call. Processing continues to block 414 where identifying information regarding the most recently accessed base station 112 is retrieved. As mentioned above, this information can be used to determine the location of the most recently accessed base station 112. Processing continues to block 416. If IP geolocation results are not available at block 416 processing continues to block 418. At block 418, if base station 112 information is available, processing continues to block 320 of FIG. 3. If no base station 112 information is available at block 418, processing continues to block 420, where the call is routed to a default emergency call center. From block 416, if IP geolocation results are available processing continues to block 422. If base station 112 information is not available at block 422, processing continues to block 216 of FIG. 2. If base station 112 information is available at block 422, processing continues to block 424. At block 424, city information from the IP geolocation measurement is checked against the base station 112 location information. If the information from these two sources is consistent, processing continues to block 426 where the call is routed to the authorized call center corresponding to the city indicated.

If the city information is not consistent between the two sources at block 424, processing continues to block 428. At block 428, state information from the two sources (the IP geolocation measurement and the base station 112 location information) is compared to see if it is consistent. If so, processing continues to block 430 where the call is routed to the authorized call center corresponding to the state indicated. If the state information from the two sources is not consistent, processing continues to block 432 where the country information from the two sources is compared. If the country information from the two sources is consistent processing continues to block 434 where the call is routed to the authorized call center corresponding to the country indicated. If the country information from the two sources is inconsistent, processing continues to block 420 where the call is routed to the default emergency call center, and the method 400 ends at block 410.

Figure 5A:
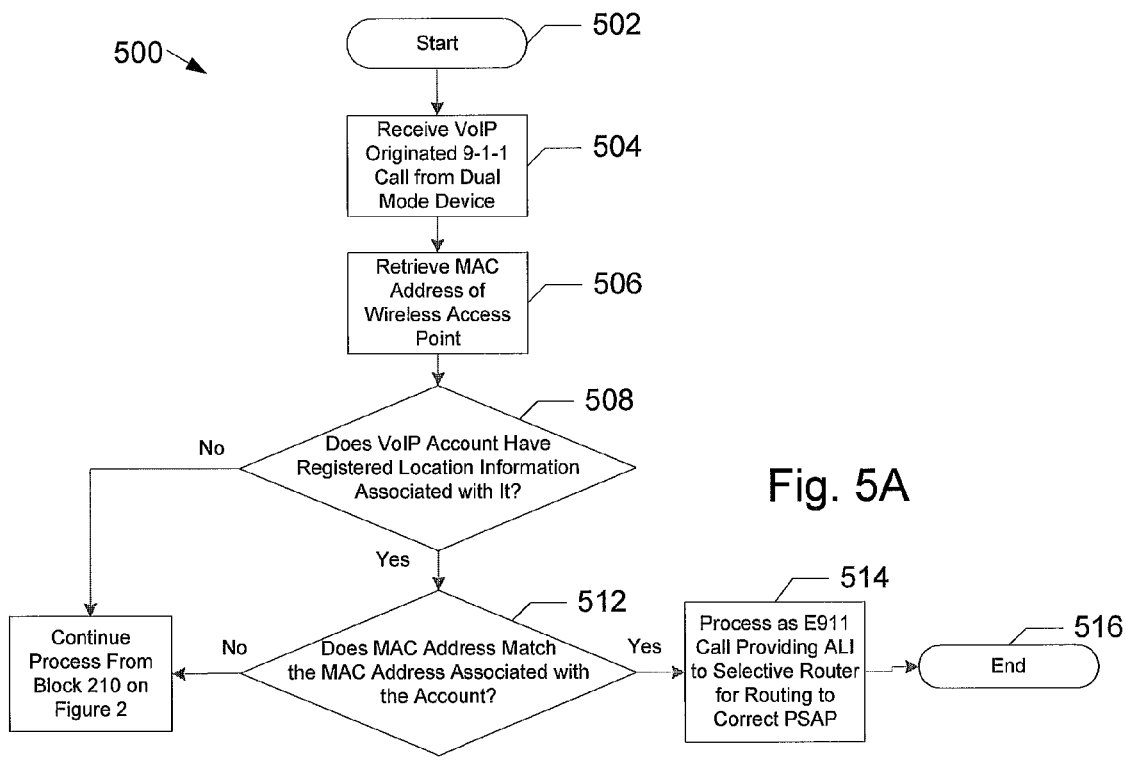
FIGS. 5A and 5B illustrate methods for alternative routing of an emergency call based on the media access control (MAC) address of the wireless access point being utilized, according to the present invention.
Figure 5B:
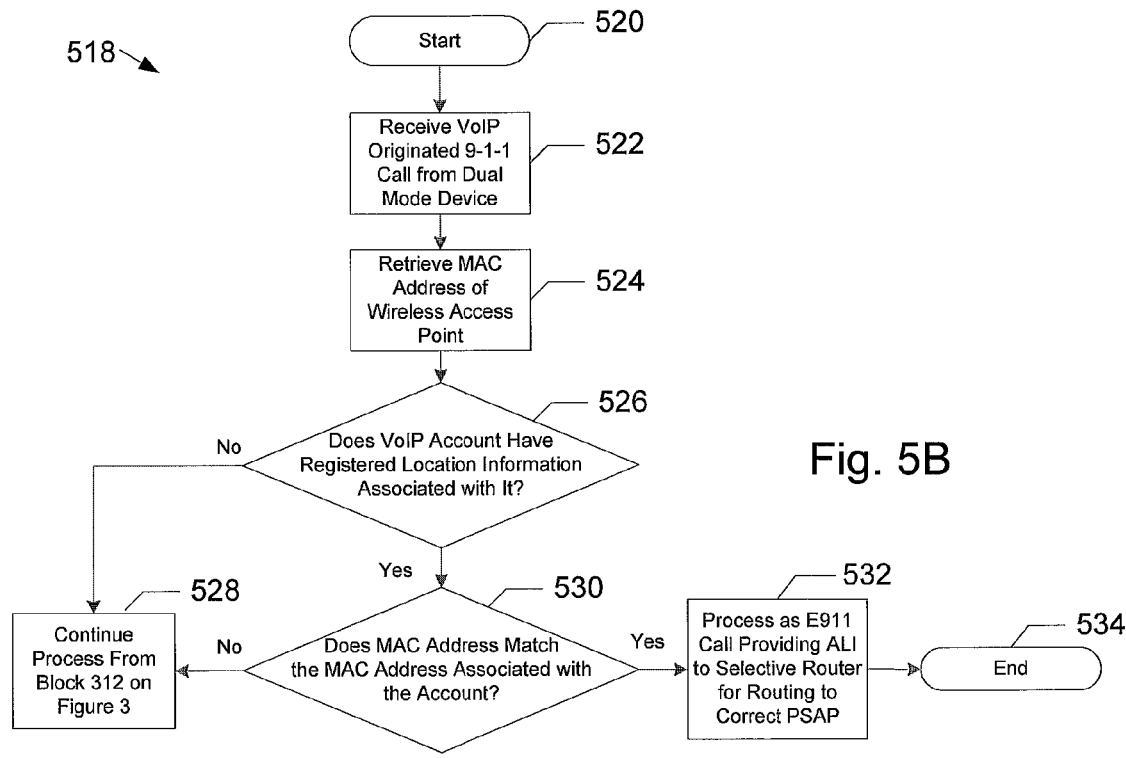

FIGS. 5A and 5B show methods 500 and 518, respectively, for alternative routing of an emergency call based on the media access control (MAC) address of the wireless access point 110 being utilized. As is known in the art, a MAC address is a unique (or quasi-unique) identifier for Ethernet (IEEE 802.3) networking devices. At the point-of-sale of the dual-mode device 108 or prior to the enablement of the VoIP mode of the dual mode phone, the purchaser can be asked to provide the MAC address of the wireless access point 110 located at the purchaser's home which will be used with the dual-mode device 108. This information can be requested at the same time the purchaser is asked for the registered location information. This MAC address can be associated with the VoIP account by the VoIP service provider 120. This information can thereafter be used to ensure that VoIP calls originated from the dual-mode device 108 are being made at the caller's home location. Using this information in this way does have potential flaws.

For example, the user can move the wireless access point 110 to another location, in which case the MAC address will match the address associated with the account even though the physical location of the caller has changed. In addition, the user could also purchase a new wireless access point 110 for use at home. In this case the physical location of the caller has not changed but the new wireless access point has a different MAC address. Regardless, the use of an MAC address in this manner can provide potential benefits. For example, a detected change in MAC address can be used to flag an account or a call as suspect with regard to its registered location information. A change in MAC address can also be used to prevent a caller from placing a VoIP call until the MAC address associated with the account has been updated. At that time the user can be prompted to update their registered location information. As mentioned above, however, in the case of an emergency call it might be considered prudent to process the call regardless of an inconsistency with an associated MAC address.

FIGS. 5A and 5B show methods 500 and 518, respectively, for incorporating a check as to whether the MAC address of a wireless access point being used to place a VoIP call matches the MAC address associated with the VoIP account in a 911 call routing process.

FIG. 5A shows method 500 which starts at block 502. At block 504, a VoIP originated 911 call is received from a dual-mode device 108. Processing continues to block 506 where a MAC address of the wireless access point 110 being used by the dual-mode device 108 is retrieved. This information can be retrieved from the IP packets sent from a wireless access point 110 to VoIP provider 120 as is known in the art. Processing continues to block 508 where a check is performed to determine if the account is associated with a registered location. If no registered location is associated with the account, processing continues to block 210 of FIG. 2. From block 508, if the account is associated with a registered location, processing continues to block 512. At block 512, the MAC address retrieved from the access point 110 is compared to the MAC address associated with the account. If the MAC addresses match, processing continues to block 514 where the call is processed according to the FCC order based on the registered location information. If the MAC addresses do not match, indicating that there is a strong possibility that the measured location information is obsolete, processing continues to block 210 of FIG. 2. The method ends at block 516.

FIG. 5B shows a method 518 which is similar to the method 500 of FIG. 5A except that at block 528 the process continues to block 312 of FIG. 3 instead of block 210 of FIG. 2 (a last base station 112 accessed method is performed instead of the IP geolocation method.) It should also be understood that a similar method can be used along with the combined IP geolocation and last base station 112 accessed method.

Figure 6A:
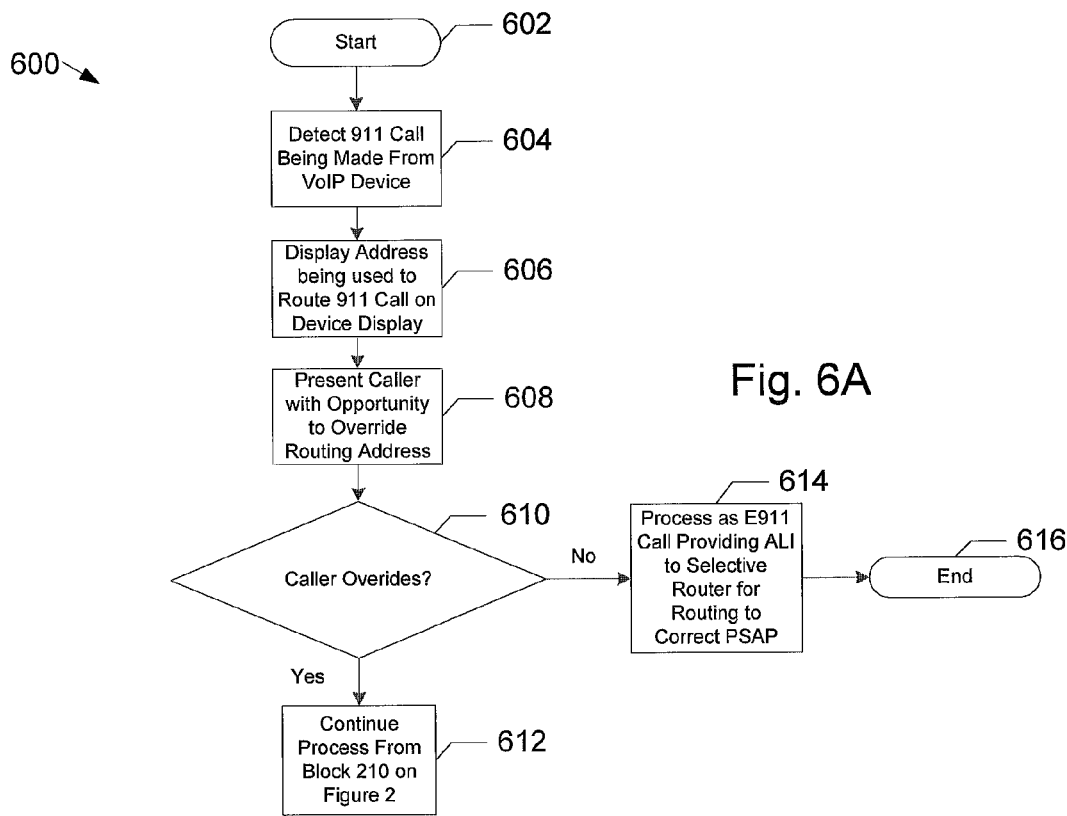
FIGS. 6A and 6B illustrate methods for including user interaction in the emergency call routing process, according to the present invention.
Figure 6B:
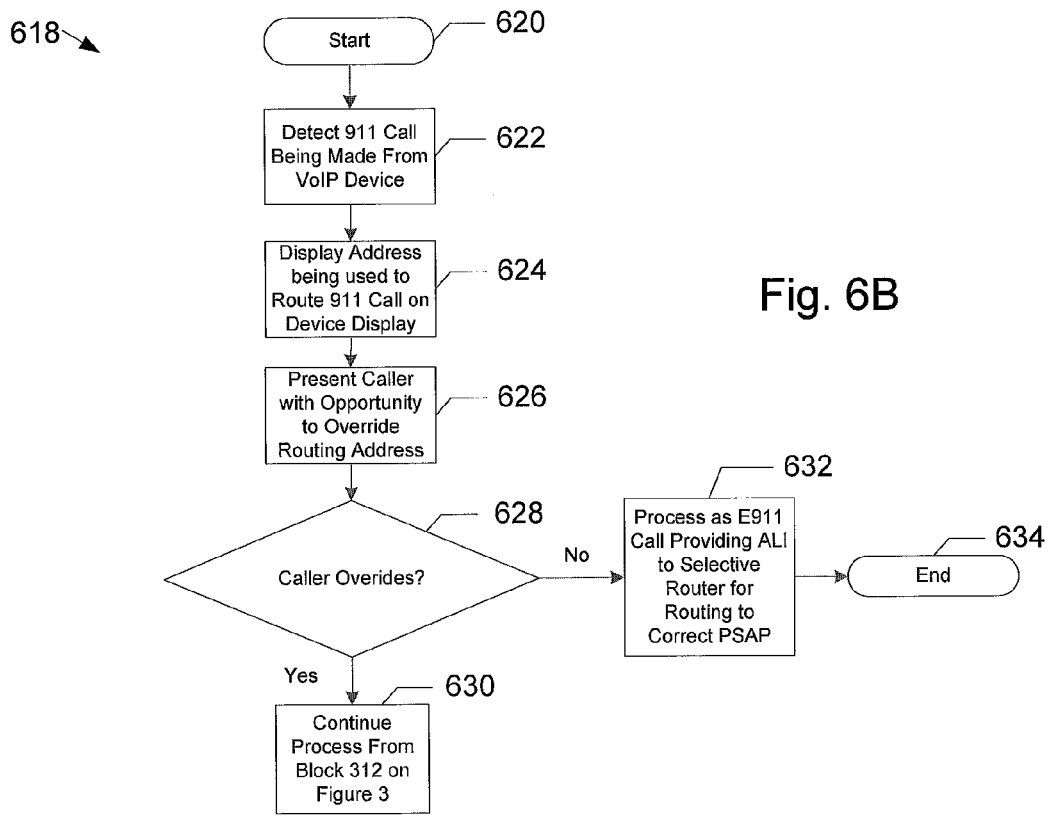

FIGS. 6A and 6B show methods 600 and 618, respectively, for including user interaction in the emergency call routing process. FIG. 6A shows method 600 which starts at 602. At block 604, a 911 call is detected being made from a VoIP device 108. This method can be implemented, for example, by a processor included in a VoIP device 108 or by a combination of VoIP service provider 120 systems and the processor. Processing continues to block 606 where the address being used to route the 911 call is shown on a display of the device 108. Processing continues to block 608 where the caller is presented with an opportunity to override 911 call routing according to the displayed address. A caller override can be useful where the caller's current location is different from the address shown on the display. Such a situation can occur, for example, where registered location information has become inaccurate due to a move by the user and a subsequent failure to update the information. At block 610, if the caller overrides the routing process then at block 612 processing continues to block 210 of FIG. 2. If the caller does not override the routing process, processing continues to block 614 where the call is processed as an E911 call. The method 600 then proceeds to block 616 and the method 600 ends.

FIG. 6B shows a method 618 which is similar to the method 600 of FIG. 6A except that at block 630 processing continues to block 312 of FIG. 3. That is, the caller override initiates a routing method based on the base station 112 last accessed by a dual mode device 108. It should be understood that the caller override could also lead to the use of the combined IP geolocation and last base station 112 accessed routing method.

Figure 7:
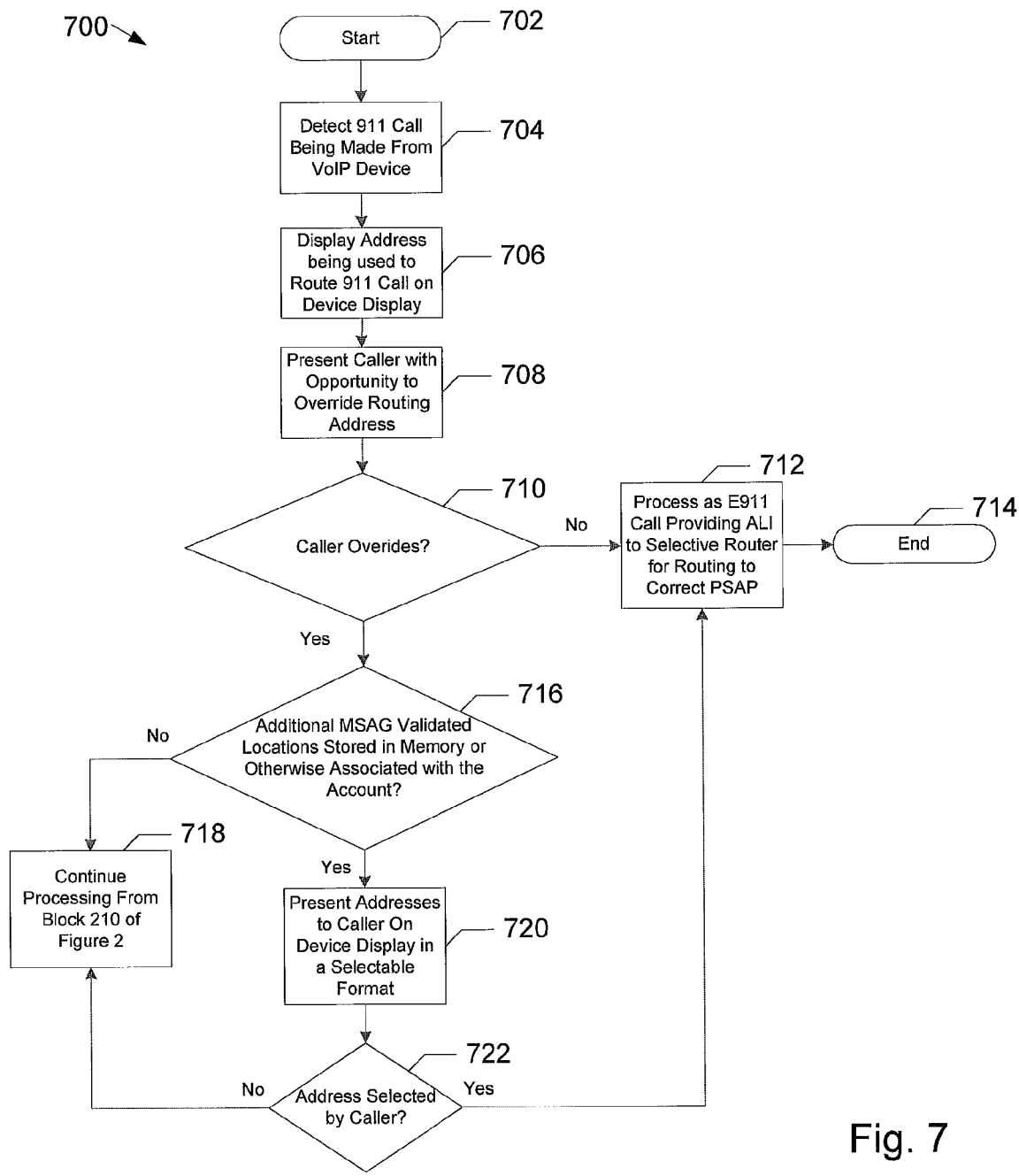
FIG. 7 illustrates a method for routing a VoIP 911 call with multiple validated addresses, according to the present invention.

FIG. 7 shows a method 700 which starts at block 702. At block 704, a 911 call is detected as being made from a VoIP device 108. Processing continues to block 706 where the address being used to route the 911 call is shown on the device 108 display. At block 708, the caller is presented with the opportunity to override routing of the 911 call based on the displayed address. At block 710, if the caller does not override the routing, processing continues to block 712 where the call is routed using the address displayed and the method ends at block 714. If the caller overrides the routing at block 710, processing continues to block 716 where the memory of the device 108 and/or VoIP service provider 120 account information is checked to determine if there are additional MSAG validated addresses associated with the VoIP call/account. If there are no such addresses, processing continues to block 210 of FIG. 2. It should be understood that block 718 could also lead to block 312 of FIG. 3 or a combined IP geolocation and last base station 112 accessed routing method as described above. If additional validated addresses are found at block 716, processing continues to block 720 where these addresses are presented to the caller on the device 108 display in a selectable format. Processing continues to block 722 where, if the caller does not select an address, a timeout can occur and processing can continue to block 210 of FIG. 2. If the caller does select an address, processing can continue to block 712 where the call is processed as an E911 call based on the address selected by the caller.

Figure 8:
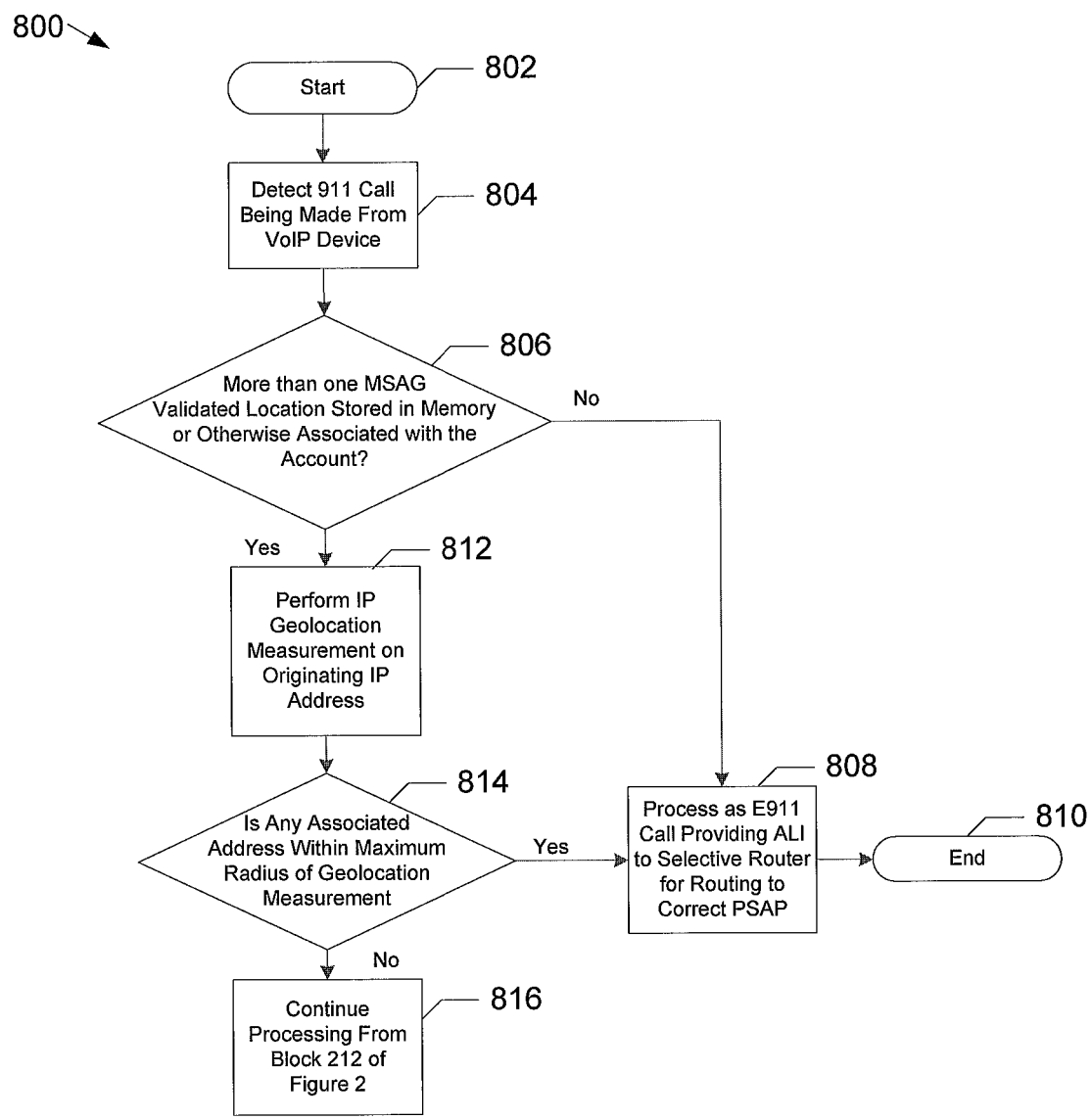
FIG. 8 illustrates another method for routing a VoIP 911 call with multiple validated addresses, according to the present invention.

FIG. 8 shows a method 800 also involving the use of additional validated addresses. The method starts at block 802 and continues to block 804 where a 911 call is detected as being made from a VoIP device 108. Processing continues to block 806 where the memory of the device 108 and/or VoIP service provider 120 account information is checked to determine if there are additional MSAG validated addresses associated with the VoIP call/account. If there are no such addresses, processing continues to block 808 where the call is processed using the registered location associated with the account (the existence of which is presumed for the purposes of this example) and the method ends at block 810. If more than one MSAG validated address is found for the call/account, processing continues to block 812 where an IP geolocation measurement is performed on the originating IP address. Processing continues to block 814 where a check is performed to determine if any of the addresses associated with the account are within some maximum radius of the results of the IP geolocation measurement. The maximum radius can be a maximum distance that is considered to be an acceptable distance between the geolocation measurement results and one of the associated addresses for that address to be used as the registered location for the emergency call. If there is an associated address that is with a maximum radius of the geolocation measurement, that address is used as the registered location and processing continues to block 808. If no address is found within the maximum radius, processing continues to block 212 of FIG. 2 where the call is routed based on the results of the IP geolocation measurement.

Figure 9:
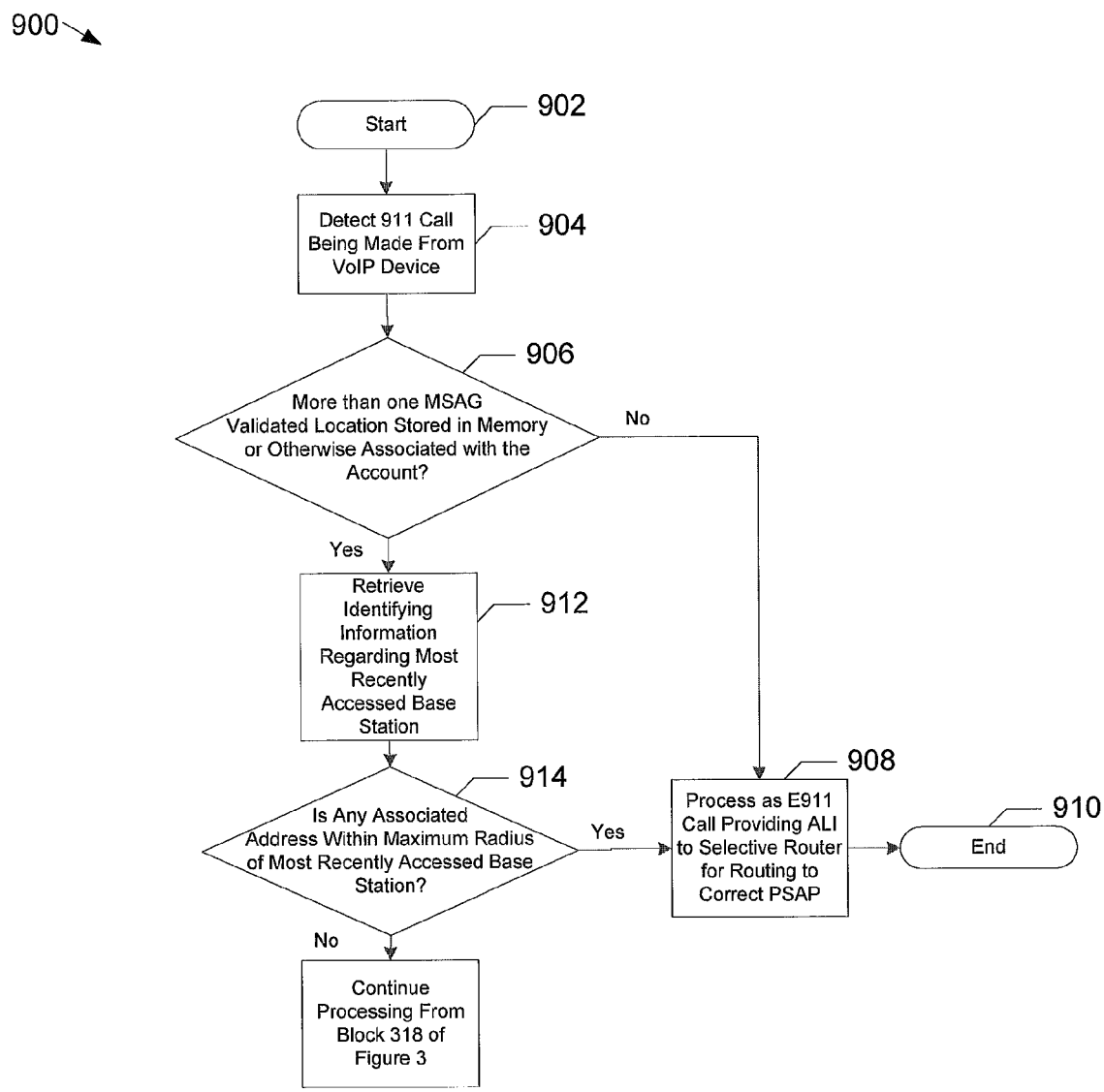
FIG. 9 illustrates yet another method for routing a VoIP 911 call with multiple validated addresses, according to the present invention.

FIG. 9 shows a method 900. The method starts at block 902 and continues to block 904 where a 911 call is detected as being made from a VoIP device 108. Processing continues to block 906 where the memory of the device 108 and/or VoIP service provider 120 account information is checked to determine if there are additional MSAG validated addresses associated with the VoIP call/account. If there are no such addresses, processing continues to block 908 where the call is processed using the registered location associated with the account (again, the existence of which is presumed for the purposes of this example) and the method ends at block 910. If more than one MSAG validated address is found for the call/account, processing continues to block 912 where the location of the last base station 112 accessed by the dual-mode device 108 is determined. Processing continues to block 914 where a check is performed to determine if any of the addresses associated with the account are within some maximum radius of the base station 112 location. If there is an associated address that is within a maximum radius of the base station 112 location, that address is used as the registered location and processing continues to block 908. If no address is found within the maximum radius, processing continues to block 318 of FIG. 3 where the call is routed based on the location of the base station 112.

Figure 10:
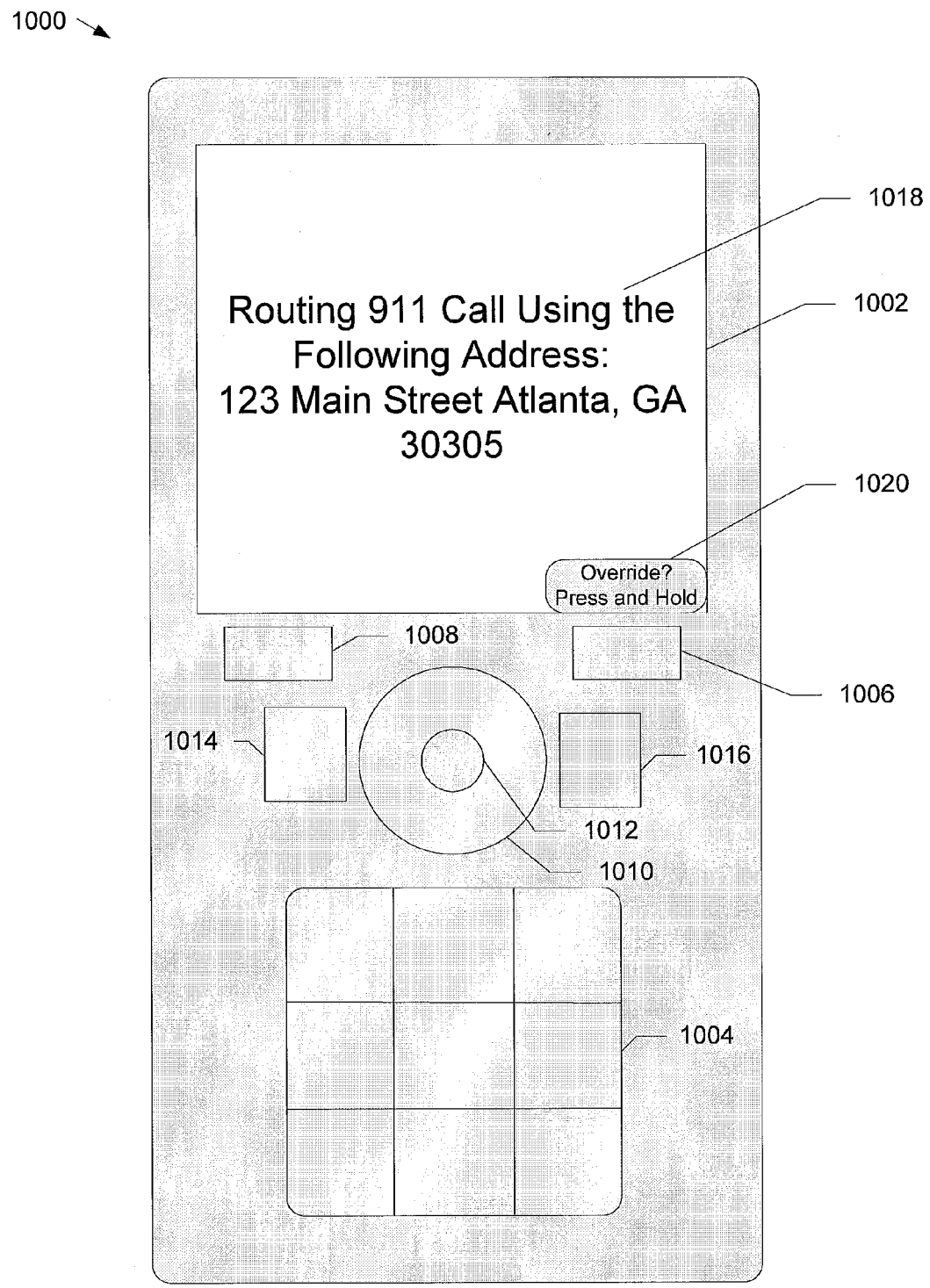
FIG. 10 illustrates a dual-mode device with location override capabilities, according to the present invention.

FIG. 10 shows a dual-mode device 1000. The device 1000 has a display 1002, a keypad 1004, softkeys 1006, 1008, a directional controller 1010, a select button 1012, a send key 1014, and an end key 1016. The display 1002 illustrates an indication 1018, which shows that a current 911 call is being routed consistent with the address shown. A softkey indicator 1020 is shown above the softkey 1006. Pressing and holding the softkey 1006 will override the routing of the 911 call based on the address shown.

Figure 11:
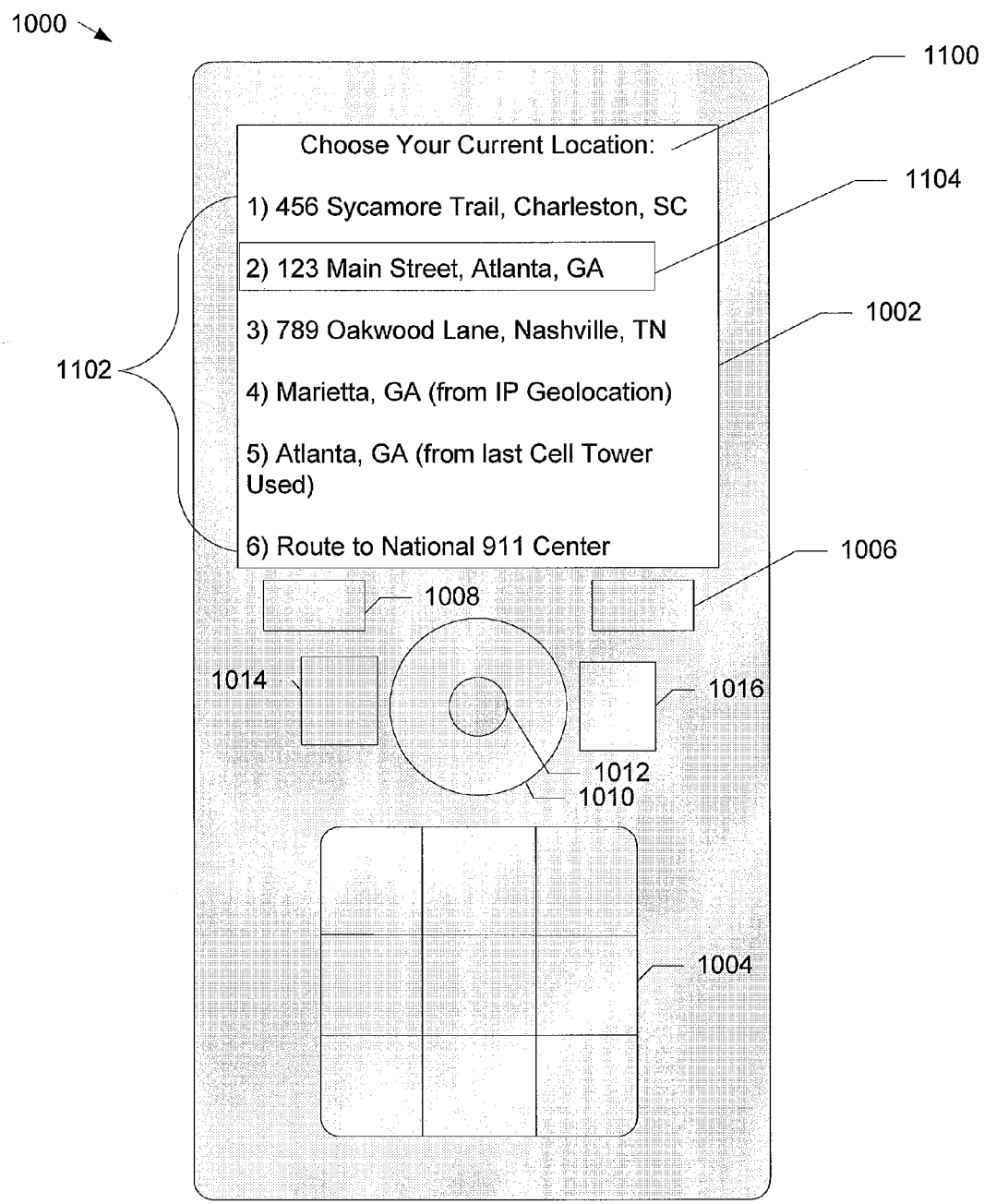
FIG. 11 illustrates a dual-mode device with a location selection screen, according to the present invention.

FIG. 11 shows the dual-mode device 1000 having a display indication 1100 which offers choices 1102 of current locations to the user. Choices 1 through 3 can be validated MSAG addresses associated with the account and/or stored in a device memory. Choice 4 shows the location of the caller as determined by IP geolocation. Choice 5 shows the location of the caller is determined based on the last base station 112 accessed by the device 108. Choice 6 is to route the call to a national emergency call center. Selection box 1104 can be moved from one choice to another using the directional controller 1010 and a choice can be selected by pressing the select key 1012. Alternatively, or in addition, the keypad number corresponding to the choice can be pressed and held. Upon the caller making a selection, the call is routed consistent with the caller's selection.

It should be understood that the sequences of method steps described herein are provided for purposes of example and are not the only sequences in which the present invention can be embodied. Many alternative sequences using combinations of the various methods disclosed will be apparent to one of skill in the art upon study of this disclosure. Such alternative sequences are within the scope of the present invention.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for routing a Voice over Internet Protocol (VoIP) originated 911 call from a VoIP device of a caller using a VoIP service provider server, the method comprising:

the VoIP service provider server receiving a caller override signal from the VoIP device for overriding registered location information associated with a VoIP account of the caller, wherein the caller override signal is initiated by the VoIP device responsive to the VoIP device: displaying a geographical address on a display of the VoIP device, wherein the geographical address indicates the registered location information, providing a notification on the display that the 911 call from the VoIP device will be routed based on the geographical address, providing a selectable caller override option for overriding the routing of the 911 call based on the geographical address, and receiving a selection of the caller override option; and in response to the caller override signal:

the VoIP service provider server performing an Internet Protocol (IP) geolocation measurement based on an originating IP address of the 911 call; and the VoIP service provider server routing the 911 call to a call center based on the results of the IP geolocation measurement, comprising:

if the IP geolocation measurement of the VoIP service provider server returns partial geolocation data, the VoIP service provider server routing the 911 call to the call center associated with a highest resolution part of the geolocation data.

2. The method of claim 1, wherein the partial geolocation data from the IP geolocation measurement of the VoIP service provider server includes state data, and the method comprises routing the 911 call to the call center being a call center associated with the state data from the IP geolocation measurement if the measurement does not return city data, but does return the state data.

3. The method of claim 2, wherein the partial location data from the IP geolocation measurement of the VoIP service provider server includes country data, and the method comprises routing the 911 call to the call center being a call center associated with the country data from the IP geolocation measurement if the measurement does not return one of city data or state data, but does return the country data.

4. The method of claim 3, wherein routing the 911 call to a call center further comprises routing the 911 call to a default call center if the IP geolocation measurement fails.

5. The method of claim 3, wherein routing the 911 call to a call center further comprises routing the 911 call to a default call center if the IP geolocation measurement does not return city data, state data, or country data.

6. The method of claim 1, wherein the 911 call is originated at a dual mode device, the method further comprising:

determining the location of the base station with which the dual mode device most recently communicated; and comparing the location of the base station to the IP geolocation results to verify the results of the IP geolocation measurement.

7. A tangible, non-transitory, computer readable medium comprising computer-executable instructions stored thereon which, when executed, perform a method comprising:

receiving a caller override signal from a caller device for overriding registered location information associated with an account of a caller, wherein the caller override signal is initiated by the caller device responsive to the caller device: displaying a geographical address on a display of the caller, wherein the geographical address indicates the registered location information, providing a notification on the display that a 911 call from the caller device will be routed based on the geographical address, providing a selectable caller override option for overriding the routing of the 911 call based on the geographical address, and receiving a selection of the caller override option; and in response to the caller override signal:

performing an Internet Protocol (IP) geolocation measurement based on an originating IP address of the 911 call from the caller device; and routing the 911 call to a call center, based on the results of the IP geolocation measurement, wherein if the IP geolocation measurement returns partial geolocation data, the routing includes routing the 911 call to the call center associated with a highest resolution part of the geolocation data.

8. The tangible, non-transitory, computer readable medium of claim 7, wherein the partial location data from the IP geolocation measurement includes state data, and the method further comprises routing the 911 call to the call center being a call center associated with the state data from the IP geolocation measurement if the measurement does not return city data, but does return the state data.

9. The tangible, non-transitory, computer readable medium of claim 8, wherein the partial location data from the IP geolocation measurement includes country data, and the method further comprises routing the 911 call to the call center being a call center associated with the country data from the IP geolocation measurement if the measurement does not return one of city data or state data, but does return the country data.

10. The tangible, non-transitory, computer readable medium of claim 9, wherein routing the 911 call to a call center further comprises routing the 911 call to a default call center if the IP geolocation measurement fails.

11. The tangible, non-transitory, computer readable medium of claim 9, wherein routing the 911 call to a call center further comprises routing the 911 call to a default call center if the IP geolocation measurement does not return city data, state data, or country data.

12. The tangible, non-transitory, computer readable medium of claim 7, wherein the 911 call is originated at a dual mode device, the method further comprising:

determining the location of the base station with which the dual mode device most recently communicated; and comparing the location of the base station to the IP geolocation results to verify the results of the IP geolocation measurement.

* * * * *